United States Patent
Arata et al.

(10) Patent No.: US 6,622,924 B2
(45) Date of Patent: Sep. 23, 2003

(54) IN-CAR SENSOR EQUIPPED WITH ASPIRATOR FAN MOTOR

(75) Inventors: Katsushi Arata, Hachioji (JP); Takashi Kobayashi, Hachioji (JP)

(73) Assignee: TGK Co., Ltd., Tokyo (JP)

( * ) Notice: Subject to any disclaimer, the term of this patent is extended or adjusted under 35 U.S.C. 154(b) by 28 days.

(21) Appl. No.: 10/247,210

(22) Filed: Sep. 19, 2002

(65) Prior Publication Data

US 2003/0019223 A1 Jan. 30, 2003

Related U.S. Application Data

(63) Continuation of application No. PCT/JP02/01982, filed on Mar. 4, 2002.

(30) Foreign Application Priority Data

Mar. 19, 2001 (JP) .......................................... 2001-078113

(51) Int. Cl.[7] .............................. B01F 3/02; G05D 21/00
(52) U.S. Cl. ................... 236/44 A; 454/229; 236/44 C; 62/176.6
(58) Field of Search ............................. 236/44 C, 44 A, 236/44 E; 62/176.6; 454/229; 261/129; 165/282

(56) References Cited

U.S. PATENT DOCUMENTS 6,347,746 B1 * 2/2002 Dage et al. ................. 236/44 C

FOREIGN PATENT DOCUMENTS

| JP | 61-91416 | 6/1986 | |
|----|----------|--------|---|
| JP | 61-183713 | 11/1986 | |
| JP | 61-183714 | 11/1986 | |
| JP | 62-110521 | 5/1987 | |
| JP | 07-232543 | * 9/1995 | ............ B60H/1/32 |
| JP | 9-123721 | 5/1997 | |
| JP | 2000-351312 | 12/2000 | |

* cited by examiner

*Primary Examiner*—Marc Norman
(74) *Attorney, Agent, or Firm*—Patterson, Thuente, Skaar & Christensen, LLC

(57) ABSTRACT

An object of the invention is to provide a low-cost in-car sensor equipped with an aspirator fan motor, which is capable of detecting temperature and humidity. A thermistor for detecting temperature and a humidity sensor are arranged at desired positions on a mounting board, and the temperature and humidity of air drawn from an air inlet port and exhausted from an air outlet port are detected. At the same time, the use of electronic circuit components forming a voltage regulator circuit and a filter circuit for coping with electromagnet interference which have been employed in a brushless motor drive circuit for the aspirator fan motor is shared by the humidity sensor. This makes it possible to reduce the number of electronic circuit components necessary for the humidity sensor, and provide a low-cost in-car sensor equipped with an aspirator fan motor, enabling construction of a more inexpensive automotive air conditioner.

2 Claims, 4 Drawing Sheets

US 6,622,924 B2

IN-CAR SENSOR EQUIPPED WITH ASPIRATOR FAN MOTOR

This application is a continuing application, filed under 35 U.S.C. §111(a), of International Application PCT/JP02/01982, filed Mar. 4, 2002.

BACKGROUND OF THE INVENTION (1) Filed of the Invention

This invention relates to an in-car sensor equipped with an aspirator fan motor, and more particularly to an in-car sensor equipped with an aspirator fan motor in an automotive air conditioner, which draws air from a predetermined position within a vehicle cabin to sample the temperature and humidity within the vehicle cabin.

(2) Description of the Related Art

Conventionally, some automotive air conditioners sample air temperature at a predetermined position within the vehicle cabin, and perform air conditioning such that the temperature within the vehicle cabin becomes equal to a preset temperature. As a device for detecting the air temperature within the vehicle cabin, an in-car sensor equipped with an aspirator fan motor is known. This in-car sensor equipped with an aspirator fan motor is comprised of a thermistor as a temperature-sensing element and an aspirator for forcibly drawing air from a predetermined position within the vehicle cabin to the thermistor. The aspirator is comprised of an aspirator fan for introducing air from the vehicle cabin to the thermistor, and a motor for driving the aspirator fan.

FIG. 3 is a central longitudinal cross-sectional view showing an example of a conventional in-car sensor equipped with an aspirator fan motor.

The conventional in-car sensor equipped with an aspirator fan motor includes an air inlet port 2 at a right-hand side of a casing 1 as viewed in the figure, which has an aspirator duct connected thereto, and an air outlet port 3 formed in the top of the casing 1. The aspirator fan motor 4 having a plurality of blades for producing an airflow from the air inlet port 2 to the air outlet port 3 is mounted in a central portion of the casing 1. A brushless motor excellent in quietness is used for a section of the aspirator fan motor 4. Space between the upstream side of the aspirator fan motor 4 and the air inlet port 2 forms a measurement chamber 5.

A mounting board 6 is arranged at the bottom of the casing 1. Mounted on the mounting board 6 are a thermistor 7 arranged within the measurement chamber 5 as a temperature-sensing element, and a brushless motor drive circuit for the aspirator fan motor 4. Further, the mounting board 6 is connected to contact pins 9 of a connector 8 formed at a left-hand side of the casing 1 as viewed in the figure. These contact pins 9 are connected to the output terminals of the thermistor 7, the power terminals of the brushless motor drive circuit, etc.

In the in-car sensor equipped with an aspirator fan motor constructed as above, when the aspirator fan motor 4 is rotated, an airflow is produced from the air inlet port 2 to the air outlet port 3. Accordingly, the thermistor 7 arranged within the measurement chamber 5 detects the temperature of air from within the vehicle cabin which flows thereto via the air inlet port 2. A signal indicative of the temperature detected by the thermistor 7 is supplied to the control system of an automotive air conditioner, not shown, arranged outside the sensor, via the contact pins 9 of the connector 8, and used for control of the temperature within the vehicle cabin.

Further, in some cases, to allow the automotive air conditioner to perform air conditioning such that the passenger compartment within the vehicle cabin is more comfortable, the humidity within the vehicle cabin is detected to perform the air conditioning control of the inside of the vehicle cabin in a manner adapted to lots of possible cases. To this end, a humidity sensor is conventionally arranged e.g. at a rear seat within the vehicle cabin, for detecting the humidity within the vehicle cabin.

FIG. 4 is a cross-sectional view of a conventional humidity sensor.

The humidity sensor includes a humidity-sensing element 11 and a conversion circuit 12, which are mounted on a mounting board 13, and accommodated within a casing 14. The casing 14 is formed with a plurality of circulation holes 15 for spontaneous ventilation of air from the vehicle cabin into the casing 14. Connected to the mounting board 13 is a cable 16 comprised of an output signal line and a power line connected to the control system of the automotive air conditioner. Further, the humidity sensor is mounted at a humidity-measuring position within the vehicle cabin, with mounting screws 17.

As the humidity-sensing element 11 mounted on the mounting board 13, various types are known. In the illustrated example, a capacitance type sensor is used. The humidity-sensing element 11 of the capacitance type is comprised of a humidity-sensitive high-polymer membrane formed on a silicon substrate, and electrodes formed on the surfaces of the silicon substrate and the humidity-sensitive high-polymer membrane. The humidity-sensitive high-polymer has a dielectric constant far smaller than that of water, and has a characteristic that the dielectric constant thereof largely increases as it absorbs moisture. To regard this characteristic as changes in the dielectric capacitance, the humidity can be measured. Therefore, a signal from the humidity-sensing element 11 cannot be directly used differently from that from the temperature-sensing element formed by the thermistor 7, and hence, the conversion circuit 12 detects and converts changes in the capacitance into a type of signal which can be handled by the control system of the automotive air conditioner. As the conversion circuit 12, there is generally used a circuit that converts a change in the capacitance, i.e. a change in humidity, into a voltage signal or a frequency signal proportional to the change.

As described above, to detect humidity within the vehicle cabin, the conventional automotive air conditioner necessitates a place where the humidity sensor is mounted, and hence it has been proposed to mount a thermistor for detecting temperature and a humidity sensor together on the in-car sensor equipped with an aspirator fan motor (Japanese Laid-Open Patent Publication (Kokai) No. 62-110521 and Japanese Laid-Open Patent Publication (Kokai) No. 2000-351312). This makes it possible to reduce the cost of the automotive air conditioner by making the same no longer necessitate a mounting place or mounting work for the humidity sensor.

However, in the conventional automotive air conditioner, the humidity sensor necessitates a conversion circuit, by its principle, and therefore, requires provision of a power supply and an element coping with electromagnetic interference for the humidity sensor, which increases the cost of the automotive air conditioner.

SUMMARY OF THE INVENTION

The present invention has been made in view of these points, and an object thereof is to provide a low-cost in-car sensor equipped with an aspirator fan motor, which includes a temperature sensor and a humidity sensor.

To solve the above problem, there is provided an in-car sensor equipped with an aspirator fan motor, for drawing air from within a vehicle cabin of a vehicle and outputting signals of temperature and humidity necessary for control of an automotive air conditioner, the in-car sensor comprising a mounting board on which electronic circuit components are mounted for driving the aspirator fan motor, a temperature sensor mounted at a desired position between an air inlet port and an air outlet port on the mounting board, for detecting a temperature of the air drawn from within the vehicle cabin, and a humidity sensor mounted at a desired position between the air let port and the air outlet port of the mounting board, for detecting a humidity of the air drawn from within the vehicle cabin, wherein electronic circuit components necessary for operation of the humidity sensor are provided by shared use of the electronic circuit components for driving the aspirator fan motor.

According to the in-car sensor equipped with an aspirator fan motor, electronic circuit components, such as a power supply circuit and an element coping with electromagnet interference, which has been necessitated by the humidity sensor are provided by the shared used of the electronic circuit components, such as a power supply circuit and an element coping with electromagnet interference, which have been employed in a drive circuit of the aspirator fan motor. This makes it possible to reduce the number of electronic circuit components necessary for the humidity sensor, and provide a more inexpensive automotive air conditioner.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described in detail hereafter based on an example in which the invention is applied to an automotive air conditioner, with reference to the accompanying drawings.

Figure 1:
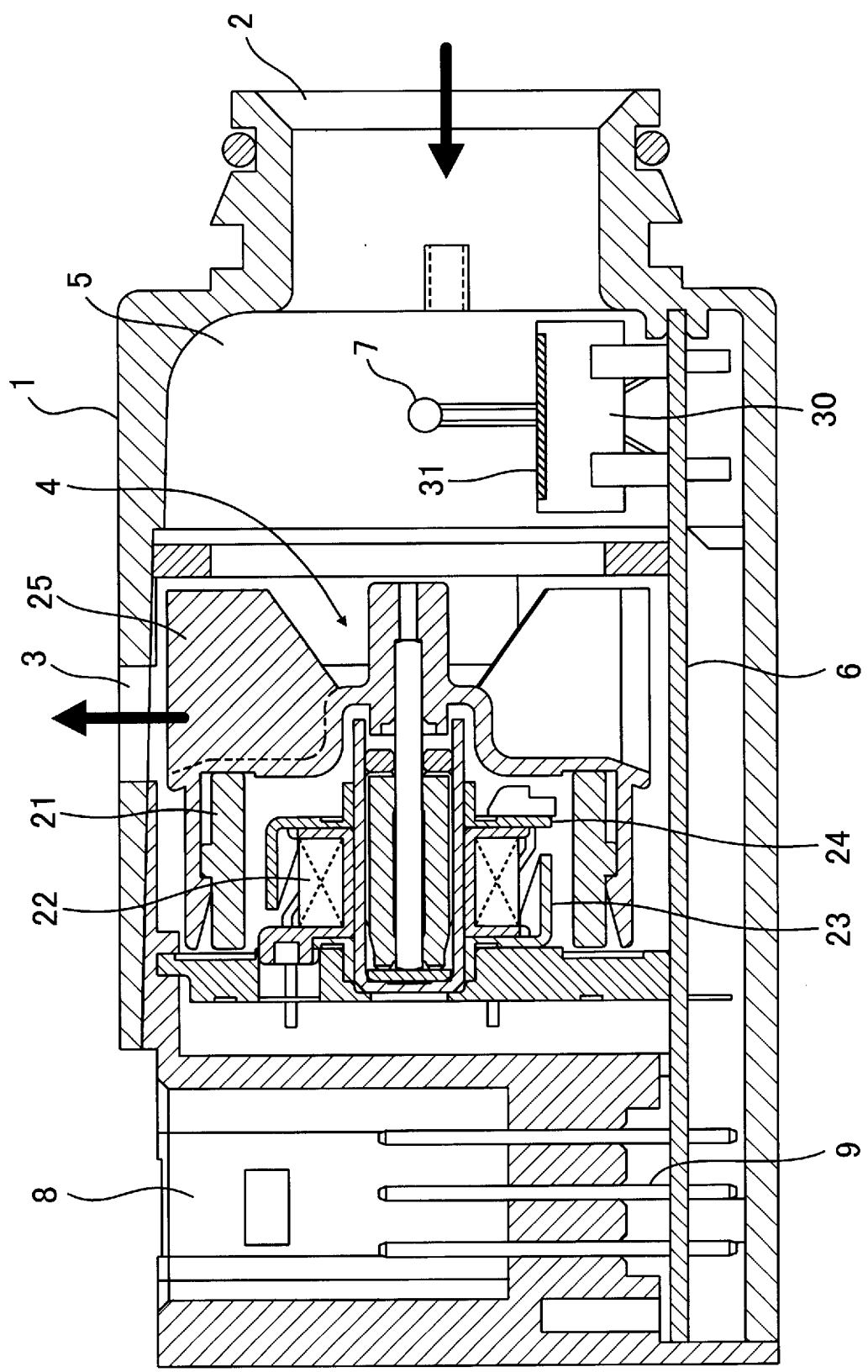
FIG. 1 is a central longitudinal sectional view showing an example of construction of an in-car sensor equipped with an aspirator fan motor, according to the invention.

FIG. 1 is a central longitudinal cross-sectional view showing an example of construction of an in-car sensor equipped with an aspirator fan motor. In FIG. 1, the same component elements as those of the conventional in-car sensor equipped with an aspirator fan motor shown in FIG. 1 are designated by identical reference numerals.

The in-car sensor equipped with an aspirator fan motor includes an air inlet port 2 at one end of a casing 1, which has an aspirator duct connected thereto for introducing air to be measured, and an air outlet port 3 formed in the top of the casing 1, for exhausting the air measured. An aspirator fan motor 4 is arranged in a central portion of the casing 1, for producing an airflow from the air inlet port 2 to the air outlet port 3. The aspirator fan motor 4 is comprised of a brushless DC motor including a magnet 21, a coil block 22 with a search coil for detecting rotation of the motor and a drive coil for driving the motor for rotation arranged therearound, and yokes 23, 24, and an impeller provided for the brushless DC motor and having a plurality of blades 25 and a holding portion for holding the magnet 21. Space between the upstream side of the aspirator fan motor 4 and the air inlet port 2 forms a measurement chamber 5.

A mounting board 6 is arranged at the bottom of the casing 1. Mounted on the mounting board 6 are a thermistor 7 arranged within the measurement chamber 5 as a temperature-sensing element, a humidity sensor 30, and a brushless motor drive circuit for the aspirator fan motor 4. As the humidity sensor 30, there is employed a capacitance type sensor including a humidity-sensing element 31, and a conversion circuit integrally formed with the humidity-sensing element, for converting changes in the capacitance dependent on the humidity into a voltage signal or a frequency signal.

Further, the casing 1 has a connector 8 arranged therein for electrical connection between the sensors and the control system of the automotive air conditioner, and a plurality of contact pins 9 provided therein are soldered to the mounting board 6. These contact pins 9 are formed by temperature signal output terminals for a temperature signal from the thermistor 7, power terminals for the brushless motor drive circuit and the humidity sensor, a rotational state output signal output terminal for outputting a signal indicative of a rotational state of the motor, and a humidity signal output terminal for the humidity sensor 30.

In the in-car sensor equipped with an aspirator fan motor constructed as above, when the aspirator fan motor 4 is rotated, an airflow is produced from the air inlet port 2 to the air outlet port 3. Accordingly, the thermistor 7 arranged within the measurement chamber 5 detects the temperature of the air from within the vehicle cabin which flows thereto from the air inlet port 2, and the humidity sensor 30 detects the humidity of the air from within the vehicle cabin. A signal indicative of temperature detected by the thermistor 7 and a signal indicative of humidity detected by the humidity sensor 30 are supplied to the control system of the automotive air conditioner via the contact pins 9 of the connector 8, and used for control of the temperature within the vehicle cabin and the like.

Figure 2:
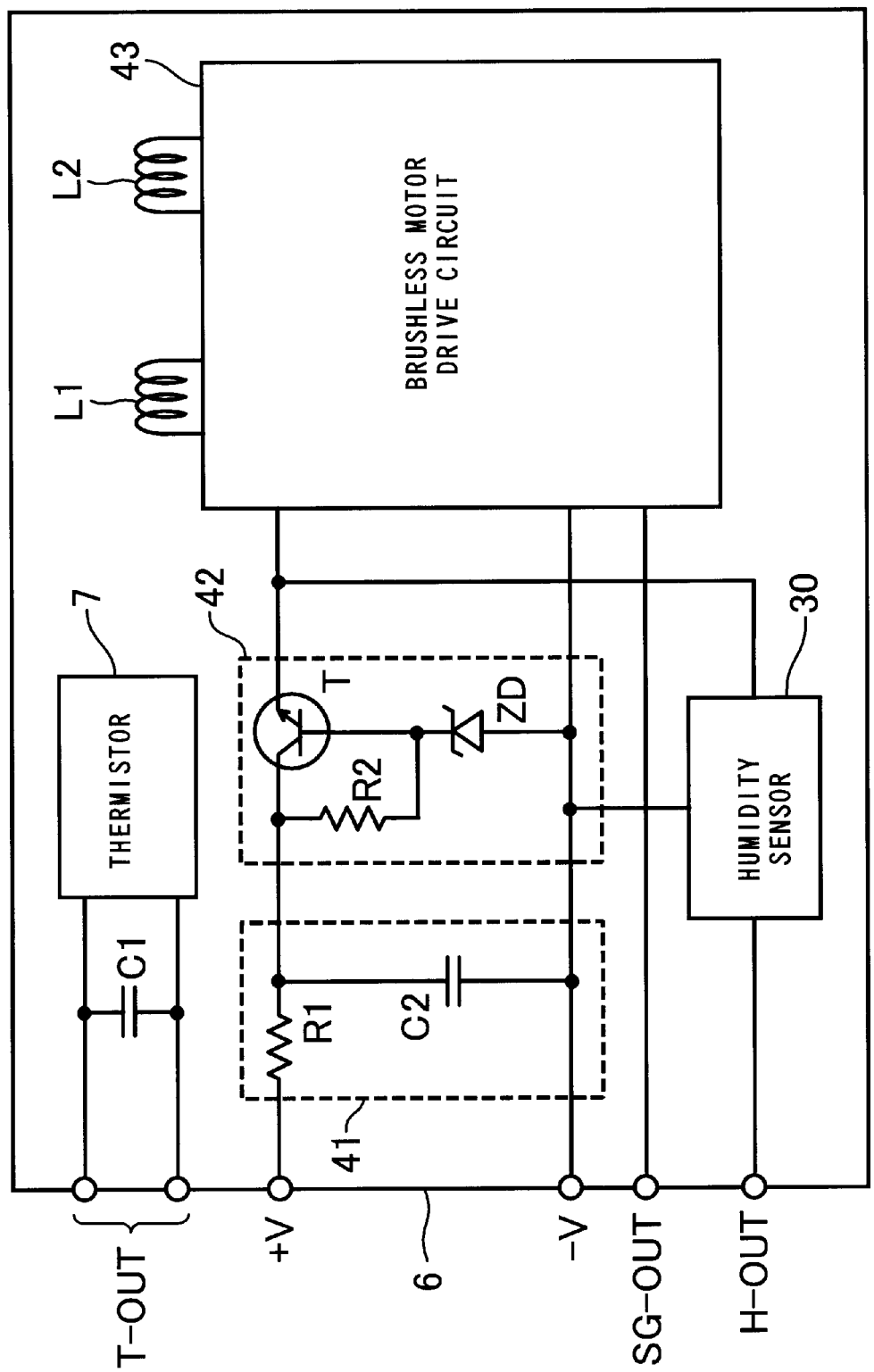
FIG. 2 is a view showing an electric circuit mounted on a mounting board.
Figure 3:
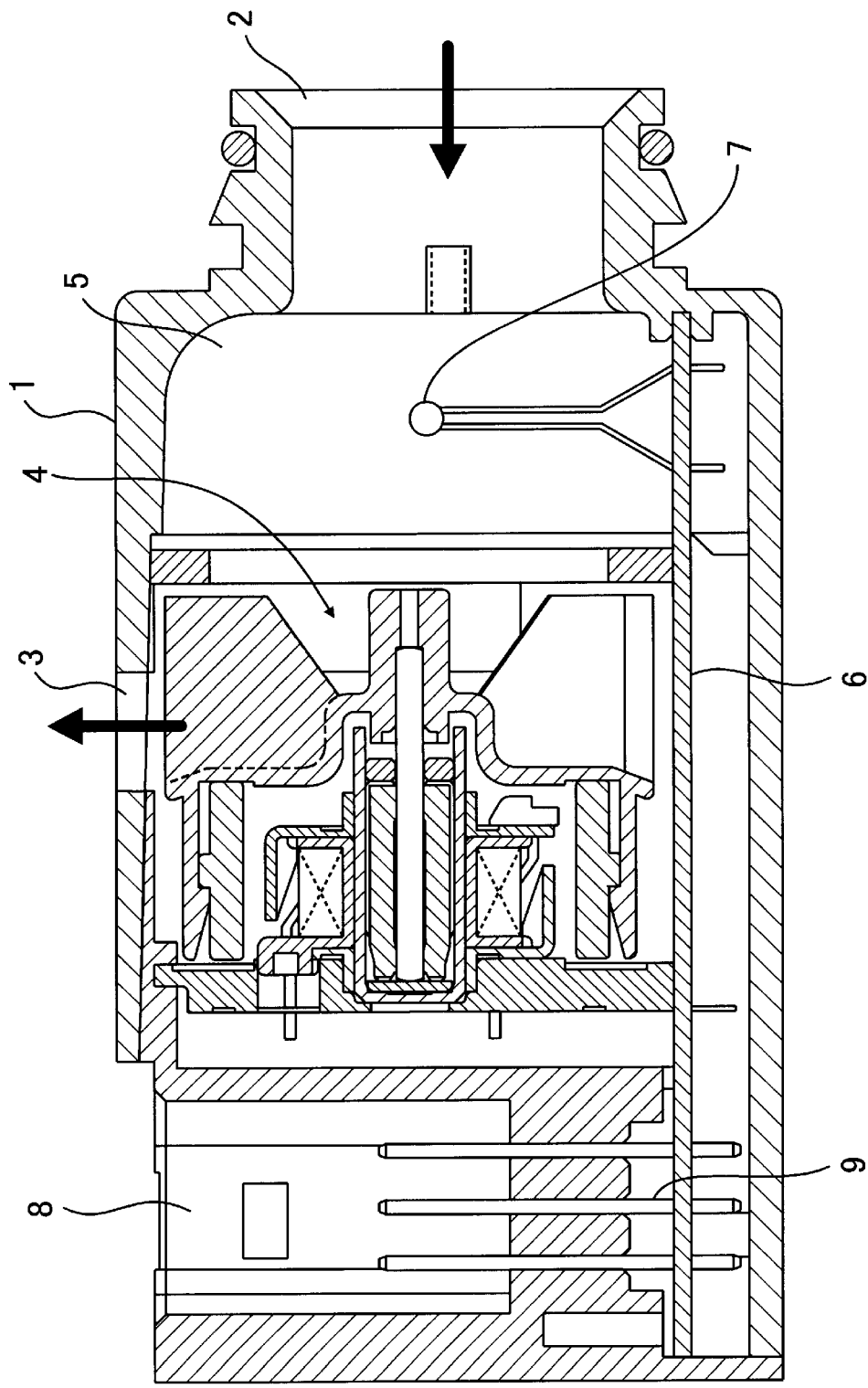
FIG. 3 is a central longitudinal cross-sectional view showing an example of construction of a conventional in-car sensor equipped with an aspirator fan motor.
Figure 4:
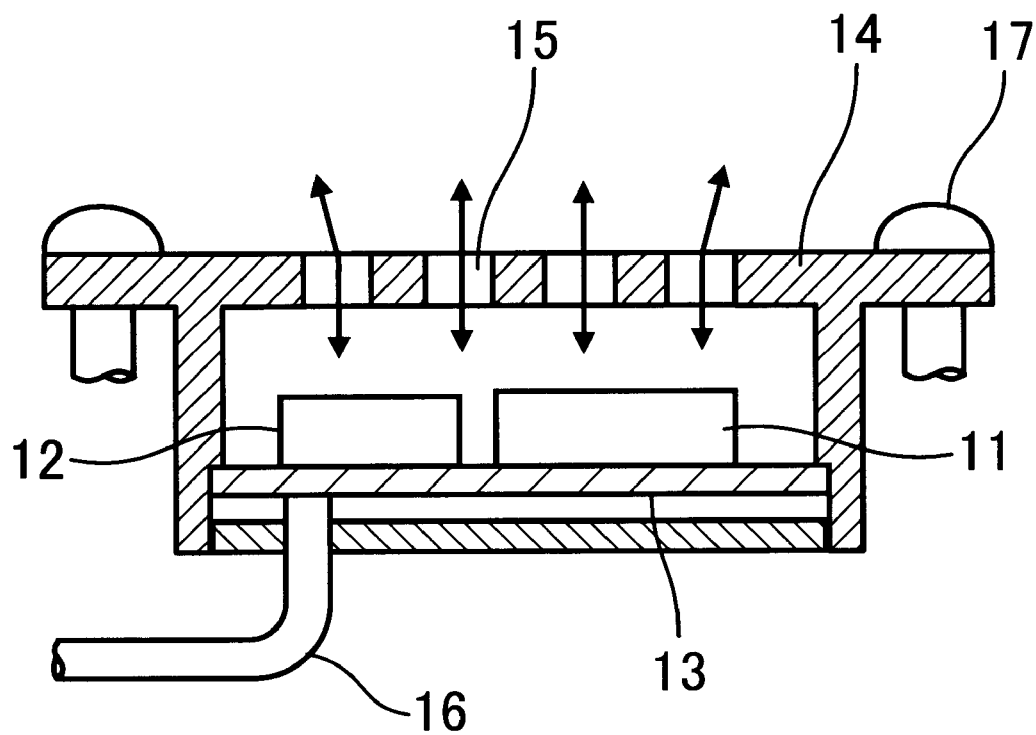
FIG. 4 is a cross-sectional view showing an example of a conventional humidity sensor.

FIG. 2 is a diagram showing an electric circuit mounted on the mounting board.

The mounting board 6 has six terminals connected to the contact pins 9 of the connector 8. That is, it has the temperature signal output terminals T-OUT, the power terminals ±V, the rotational state signal output terminal SG-OUT, and the humidity signal output terminal H-OUT.

The temperature signal output terminals T-OUT are directly connected to two terminals of the thermistor 7, and a capacitor C1 is connected in parallel to the terminals of the thermistor 7, for absorbing high-frequency noise. Connected to the power terminals ±V is a filter circuit 41 formed by a resistance R1 and a capacitor C2, for absorbing surge voltage superposed on the power line. The filter circuit 41 is connected to the power input of the brushless motor drive circuit 43 via a voltage regulator circuit 42 formed by a transistor T, a resistance R2, a Zener diode ZD. The rotational state signal output terminal SG-OUT is connected to an output terminal of the brushless motor drive circuit 43 for outputting the rotational state signal, and the rotational state signal output from this terminal is supplied to the control system of the automotive air conditioner where it is used for detecting an abnormal rotational state. The humidity signal output terminal H-OUT is connected to a signal output terminal of the humidity sensor 30, and supplies the voltage signal or frequency signal indicative of the humidity detected by the humidity sensor 30 to the control system of the automotive air conditioner.

The brushless motor drive circuit 43 is connected to the search coil L1 and the drive coil L2 forming the brushless DC motor. The search coil L1 detects a voltage induced by rotation of the magnet 21 to thereby detect rotation of the motor, and the drive coil L2 is turned on or off based on the detected rotation of the motor to thereby produce propulsive torque, thereby driving the motor for rotation.

The humidity sensor 30 is connected to the voltage regulator circuit 42 that supplies power to the brushless motor drive circuit 43 to have power supplied therefrom. Thus, through the shared use of the filter circuit 41 and the voltage regulator circuit 42 used by the brushless motor drive circuit 43, provision of a power supply and a power line necessary for operating the humidity sensor 30 can be dispensed with, so that compared with the case of the humidity sensor 30 being separately provided, the cost of the automotive air conditioner can be reduced. Further, since the humidity sensor 30 also shares the use of the filter circuit 41, it is unnecessary to provide a special element for coping with electromagnet interference.

It should be noted that although in the above embodiment, the humidity sensor 30 is arranged on the upstream side of the aspirator fan motor 4, this is not limitative, but it may be arranged at a desired position between the air inlet port 2 and the air outlet port 3.

As described heretofore, according to the invention, electronic circuit components, such as a power supply circuit and an element coping with electromagnet interference, which has been necessitated by the humidity sensor are provided by the shared use of electronic circuit components, such as a power supply circuit and an element coping with electromagnet interference, which have been employed in the drive circuit of the aspirator fan motor. This makes it possible to reduce the number of electronic circuit components necessary for the humidity sensor, and provide a low-cost in-car sensor equipped with an aspirator fan motor, including a temperature sensor and a humidity sensor, so that it is possible to provide a more inexpensive configuration of the automotive air conditioner.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An in-car sensor equipped with an aspirator fan motor, for drawing air from within a vehicle cabin of a vehicle and outputting signals of temperature and humidity necessary for control of an automotive air conditioner, the in-car sensor comprising:
 a mounting board on which electronic circuit components are mounted for driving the aspirator fan motor;
 a temperature sensor mounted at a desired position between an air inlet port and an air outlet port on the mounting board, for detecting a temperature of the air drawn from within the vehicle cabin; and
 a humidity sensor including a conversion circuit integrally formed therewith, mounted at a desired position between the air inlet port and the air outlet port on the mounting board, for detecting a humidity of the air drawn from within the vehicle cabin,
 wherein said conversion circuit of the humidity sensor is provided by shared use of the electronic circuit components for driving the aspirator fan motor.

2. The in-car sensor equipped with an aspirator fan motor, according to claim 1, wherein power lines of the humidity sensor are provided by shared use of power lines of the aspirator fan motor.

* * * * *